US008825860B2

(12) United States Patent
Linsky et al.

(10) Patent No.: US 8,825,860 B2
(45) Date of Patent: Sep. 2, 2014

(54) METHOD AND APPARATUS TO FACILITATE VOICE ACTIVITY DETECTION AND COEXISTENCE MANAGER DECISIONS

(75) Inventors: Joel Benjamin Linsky, San Diego, CA (US); Jibing Wang, San Diego, CA (US); Tamer A. Kadous, San Diego, CA (US); Ashok Mantravadi, San Diego, CA (US); Pranav Dayal, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 121 days.

(21) Appl. No.: 13/012,420

(22) Filed: Jan. 24, 2011

(65) Prior Publication Data

US 2012/0030357 A1 Feb. 2, 2012

Related U.S. Application Data

(60) Provisional application No. 61/319,095, filed on Mar. 30, 2010.

(51) Int. Cl.
*G06F 15/173* (2006.01)
*H04W 88/06* (2009.01)
*H04W 72/12* (2009.01)

(52) U.S. Cl.
CPC .......... *H04W 72/1215* (2013.01); *H04W 88/06* (2013.01); *H04W 72/1242* (2013.01)
USPC ........... 709/226; 370/444; 370/447; 370/461; 370/462

(58) Field of Classification Search
CPC ............ H04W 72/082; H04W 52/146; H04W 72/0413
USPC ...................... 709/226; 370/395.42, 444, 447, 370/461–462
See application file for complete search history.

(56) References Cited

U.S. PATENT DOCUMENTS

| | | | | |
|---|---|---|---|---|
| 6,324,570 B1 * | 11/2001 | Tonchev et al. | ............... | 709/207 |
| 7,676,507 B2 * | 3/2010 | Maim | .................... | 707/999.204 |
| 8,036,690 B1 * | 10/2011 | Delker et al. | .................. | 455/512 |
| 8,121,117 B1 * | 2/2012 | Amdahl et al. | ............... | 370/389 |
| 8,176,214 B2 * | 5/2012 | Jones et al. | ...................... | 710/14 |
| 2006/0030265 A1 | 2/2006 | Desai et al. | | |
| 2006/0200350 A1 * | 9/2006 | Attwater et al. | .............. | 704/251 |
| 2008/0101231 A1 * | 5/2008 | Lai et al. | ........................ | 370/235 |
| 2008/0123610 A1 | 5/2008 | Desai et al. | | |
| 2009/0073959 A1 * | 3/2009 | Xu | .................. | 370/352 |
| 2009/0147763 A1 | 6/2009 | Desai et al. | | |
| 2009/0164032 A1 * | 6/2009 | Kedem | ............................ | 700/94 |
| 2009/0201852 A1 | 8/2009 | Chen | | |
| 2011/0194538 A1 * | 8/2011 | Zheng et al. | .................. | 370/335 |

FOREIGN PATENT DOCUMENTS

| | | |
|---|---|---|
| EP | 1928197 A2 | 6/2008 |
| WO | WO2009086851 A1 | 7/2009 |
| WO | WO 2009137295 A2 * | 11/2009 |

OTHER PUBLICATIONS

International Search Report and Written Opinion—PCTIUS2011/030499, ISA/EPO—Jun. 9, 2011.

* cited by examiner

*Primary Examiner* — Andrew Chriss
*Assistant Examiner* — Romani Ohri
(74) *Attorney, Agent, or Firm* — Rupit M. Patel

(57) ABSTRACT

A system and method to facilitate voice activity detection and coexistence manager decisions is provided and include identifying a connection utilizing a first resource and a content stream corresponding to the connection, where the first resource conflicts with a second resource. The content of the content stream is classified into multiple levels based on a value of the content and then a priority is assigned to the first and second resources based on the level of the content of the first resource.

21 Claims, 10 Drawing Sheets

METHOD AND APPARATUS TO FACILITATE VOICE ACTIVITY DETECTION AND COEXISTENCE MANAGER DECISIONS

CROSS REFERENCE TO RELATED APPLICATION

The present application claims the benefit of U.S. Provisional Patent Application No. 61/319,095, filed Mar. 30, 2010, entitled "METHOD AND APPARATUS TO FACILITATE VOICE ACTIVITY DETECTION AND COEXISTENCE MANAGER DECISIONS," the disclosure of which is expressly incorporated by reference herein in its entirety.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), CDMA2000, WiMAX, WLAN (e.g., WiFi), Bluetooth, LTE, and the like.

An example mobile device is an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue because LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or wireless local area network (WLAN) signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher as reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports for handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

BRIEF SUMMARY

One embodiment discloses a system for wireless communication and includes identifying a connection utilizing a first resource and a content stream corresponding to the connection, where the first resource conflicts with a second resource. The content of the content stream is classified into multiple levels based on a value of the content and then a priority is assigned to the first and second resources based on the level of the content of the first resource.

Another embodiment discloses a system for wireless communication and includes a means for identifying a connection utilizing a first resource and a content stream corresponding to the connection. The first resource conflicts with a second resource. A classification means classifies the content of the content stream into multiple levels based on a value of the content. An assignment means assigns a priority to the first and second resources based on the level of the content of the first resource.

In another embodiment, a computer program product for wireless communications in a wireless network includes a computer-readable medium having a recorded program code. The program code includes program code to identify a connection utilizing a first resource and a content stream corresponding to the connection, the first resource conflicting with a second resource. Program code is included to classify content of the content stream into multiple levels based on a value of the content. Additionally, program code assigns a priority to the first and second resources based on the level of the content of the first resource.

Another embodiment discloses an apparatus for wireless communication and includes a memory and at least one processor coupled to the memory. The processor is configured to identify a connection utilizing a first resource and a content stream corresponding to the connection, where the first resource conflicts with a second resource. The processor classifies the content of the content stream into multiple levels based on a value of the content and then assigns a priority to the first and second resources based on the level of the content of the first resource.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
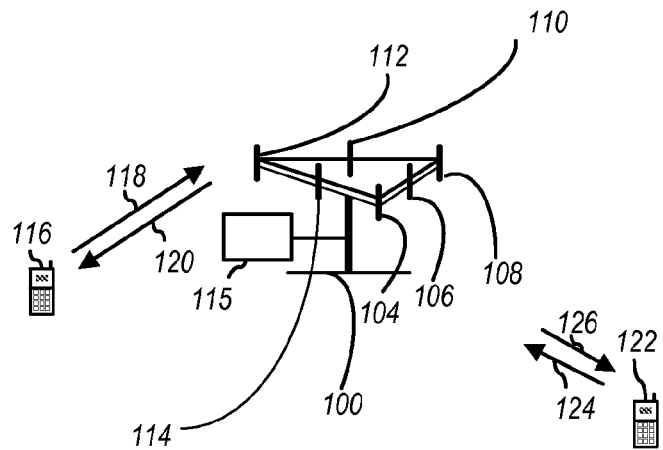
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for Bluetooth/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (IA) 118. The UE 122 is in communication with antennas 106 and 108, while antennas 106 and 108 transmit information to the UE 122 over a downlink (DL) 126 and receive information from the UE 122 over an uplink 124. In an FDD system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
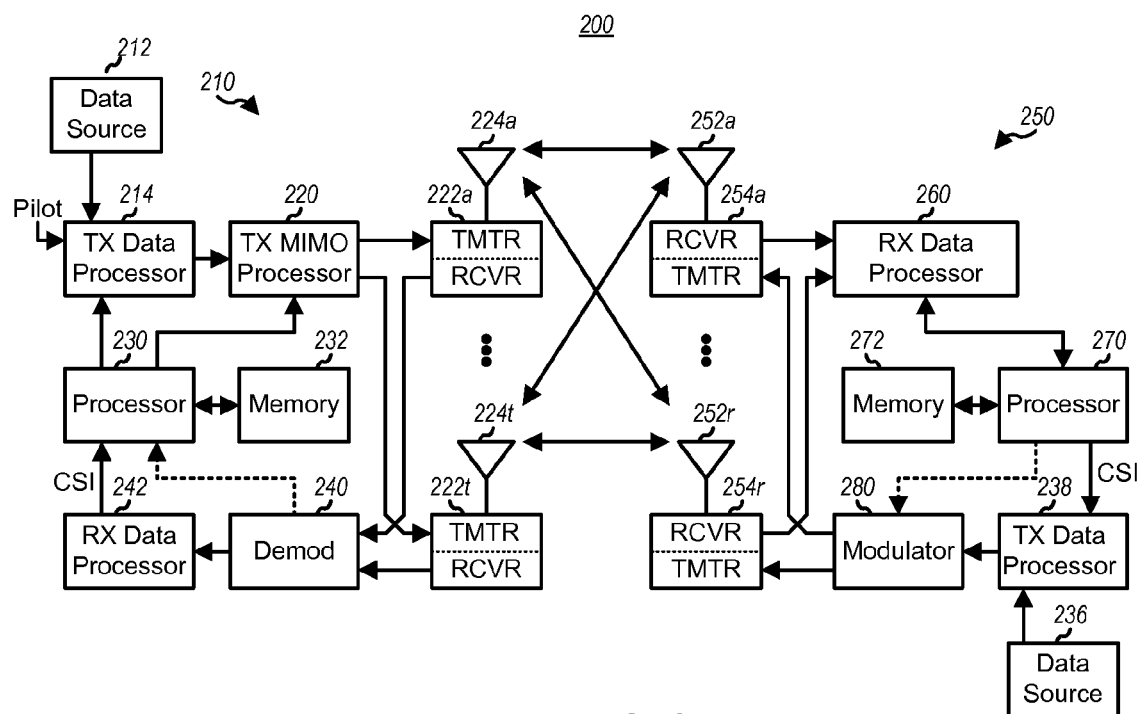
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, wherein NS≤min{NT, NR}. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides NT modulation symbol streams to NT transmitters (TMTR) 222$a$ through 222$t$. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from the transmitters 222$a$ through 222$t$ are then transmitted from NT antennas 224$a$ through 224$t$, respectively.

At a receiver system 250, the transmitted modulated signals are received by NR antennas 252$a$ through 252$r$ and the received signal from each antenna 252 is provided to a respective receiver (RCVR) 254$a$ through 254$r$. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NR "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254$a$ through 254$r$, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
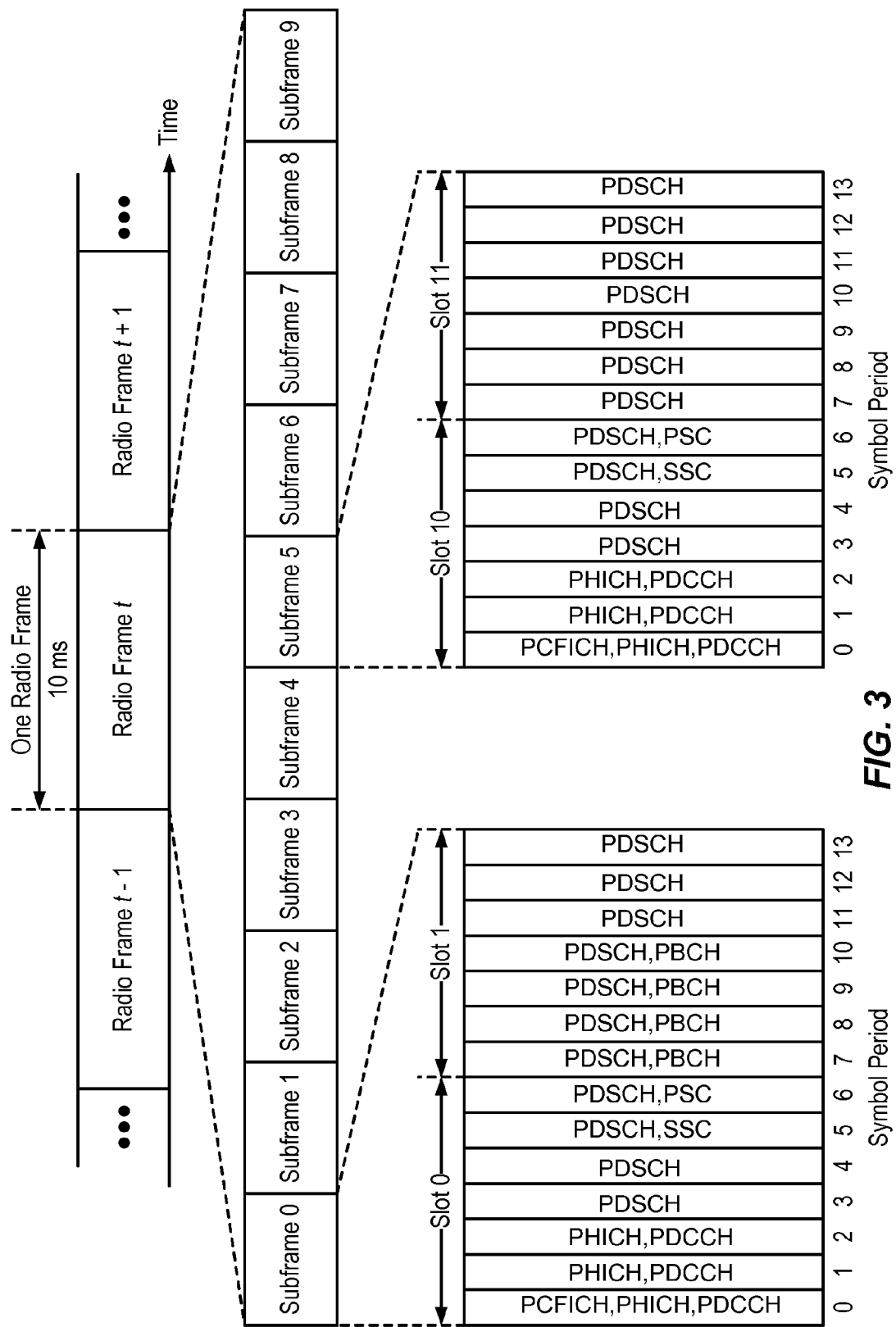
FIG. 3 illustrates an exemplary frame structure in downlink Long Term Evolution (LTE) communications.

FIG. 3 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 14 symbol periods for an extended cyclic prefix. The 2L symbol periods in each subframe may be assigned indices of 0 through 2L–1. The available time frequency resources may be partitioned into resource blocks. Each resource block may cover N subcarriers (e.g., 12 subcarriers) in one slot.

In LTE/-A, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 3. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

Figure 4:
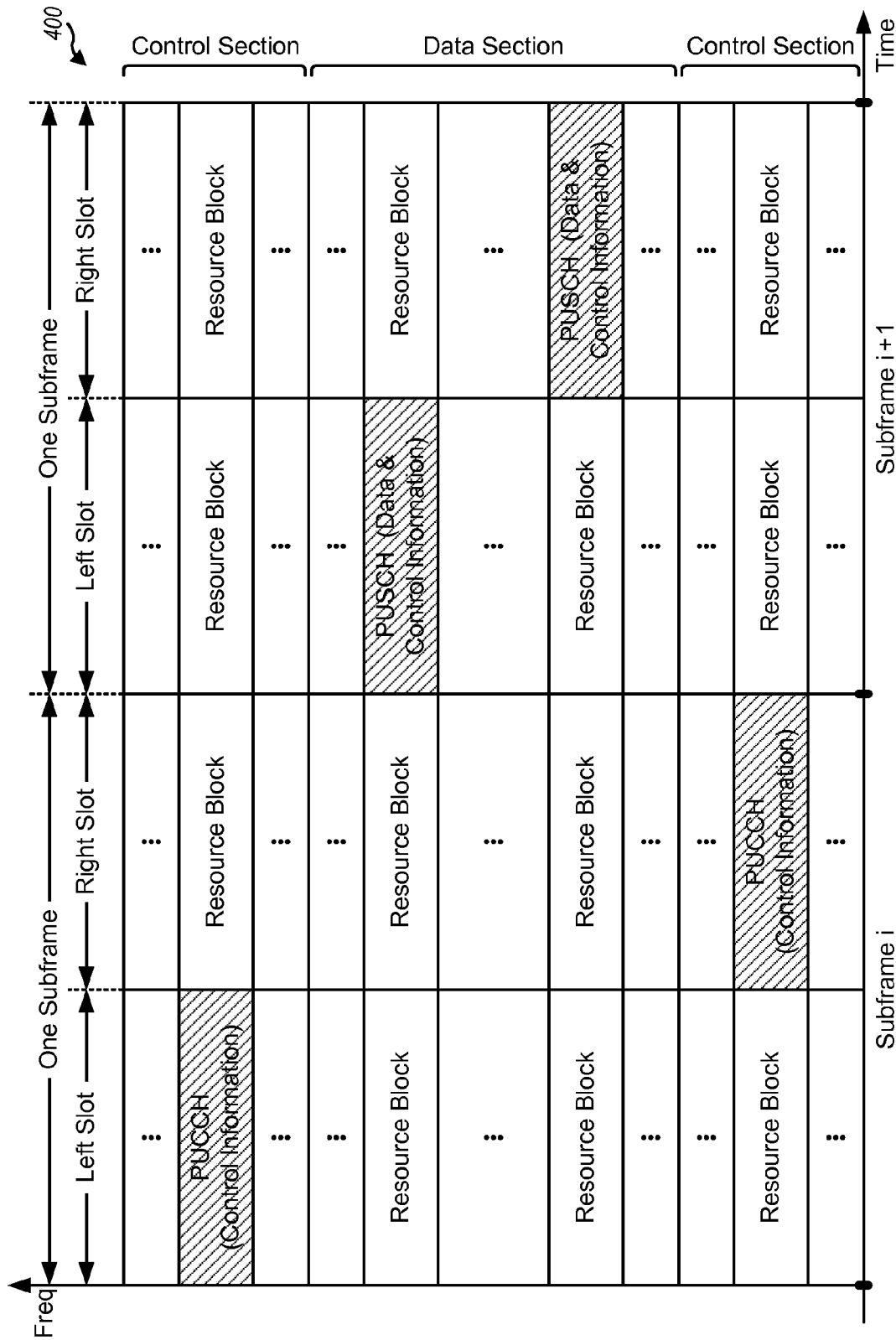
FIG. 4 is a block diagram conceptually illustrating an exemplary frame structure in uplink Long Term Evolution (LTE) communications.

FIG. 4 is a block diagram conceptually illustrating an exemplary frame structure 400 in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
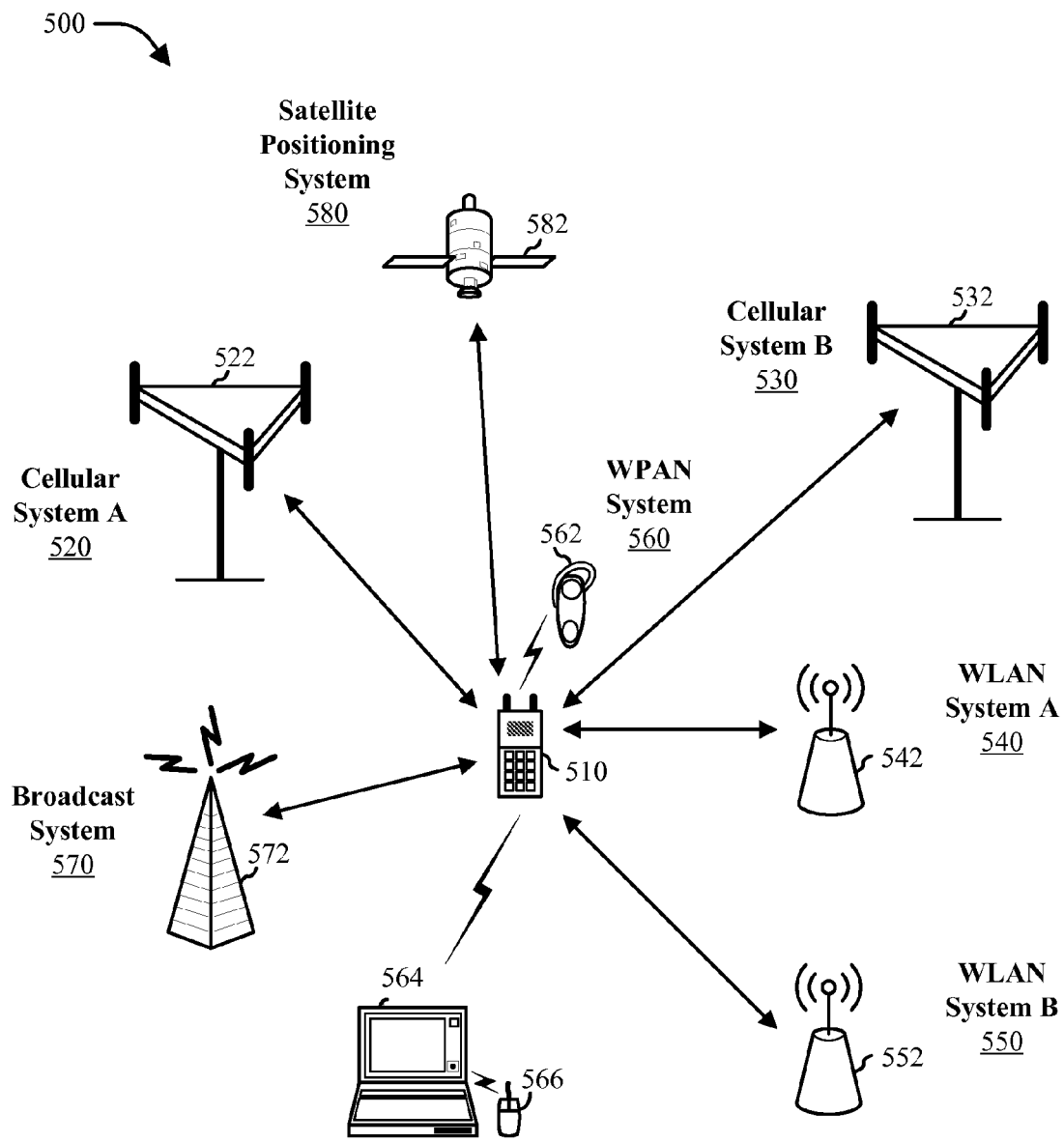
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC- FDMA), or other suitable system. A CDMA system can implement a radio technology such as Universal Terrestrial Radio Access (UTRA), CDMA2000, etc. UTRA includes Wideband CDMA (WCDMA) and other variants of CDMA. Moreover, CDMA2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
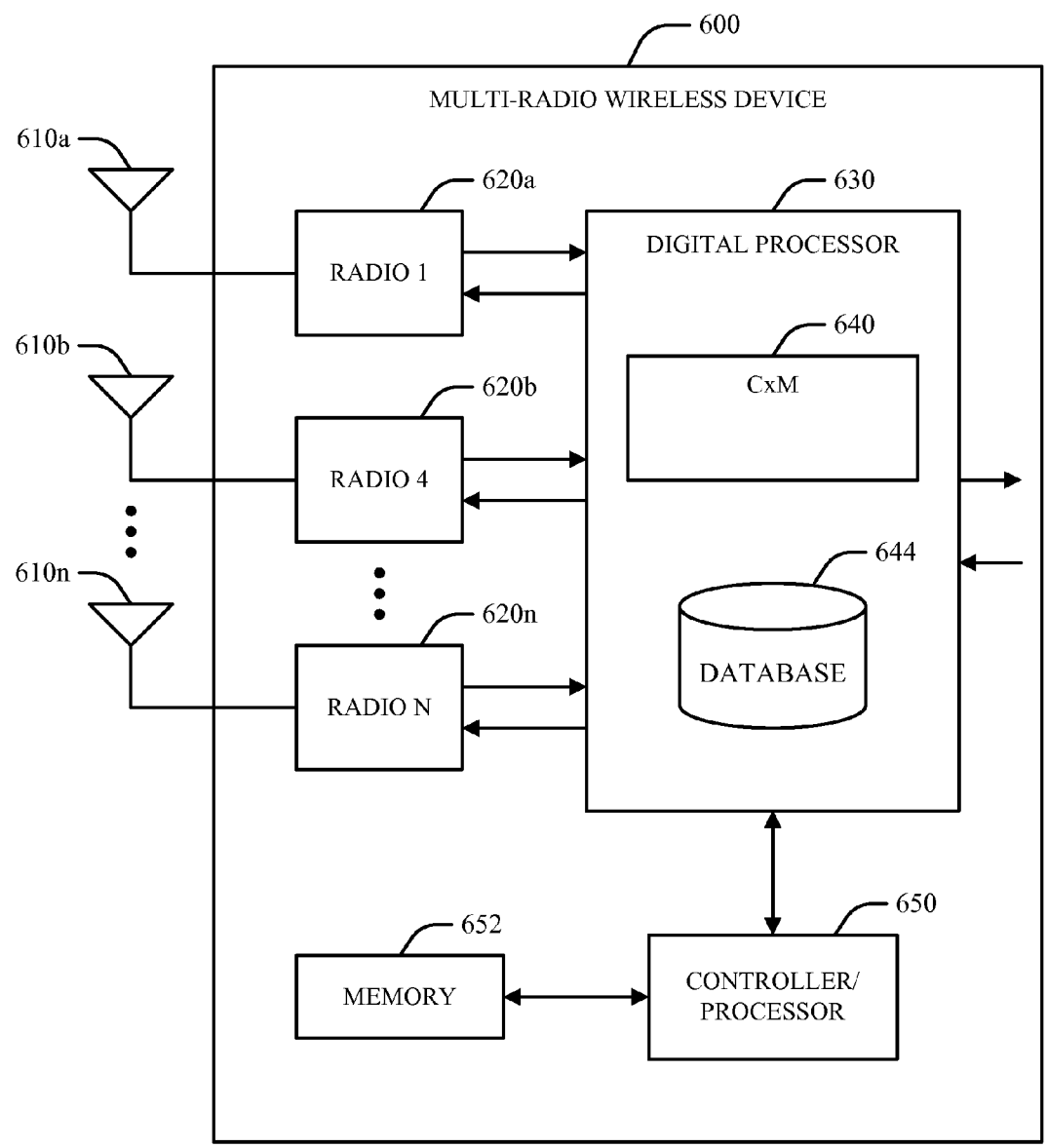
FIG. 6 is a block diagram of an example design for a multi-radio wireless device.

Referring to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
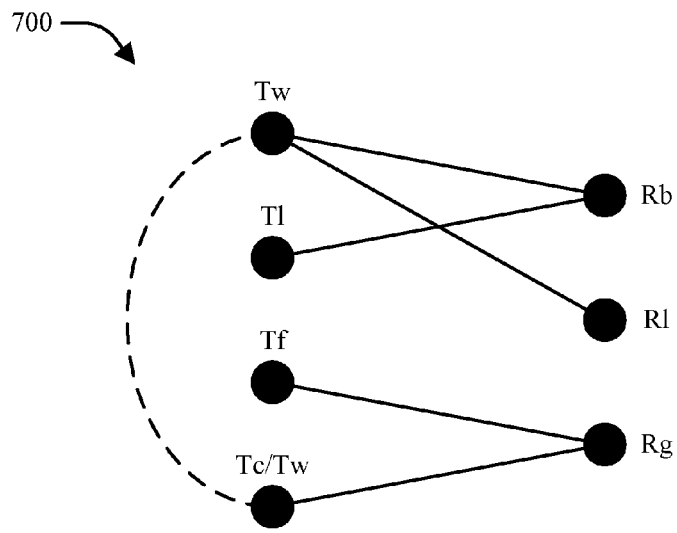
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. The CxM 640 may perform one or more processes. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
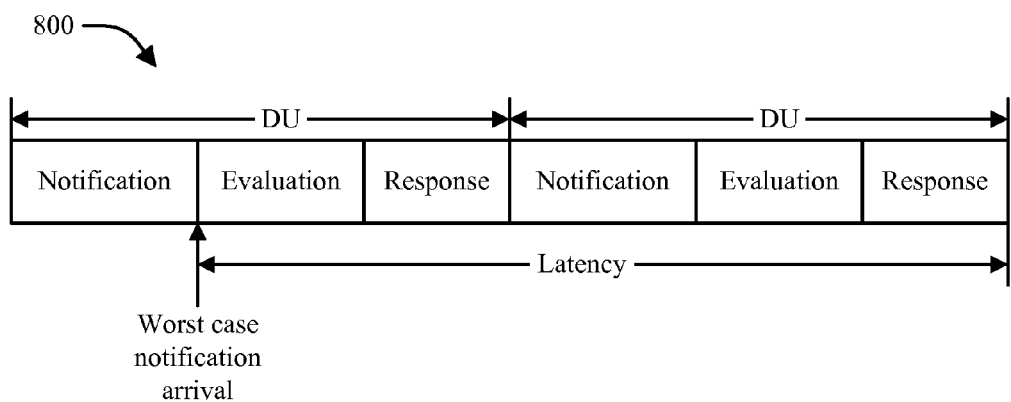
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for the CxM operation may be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 9:
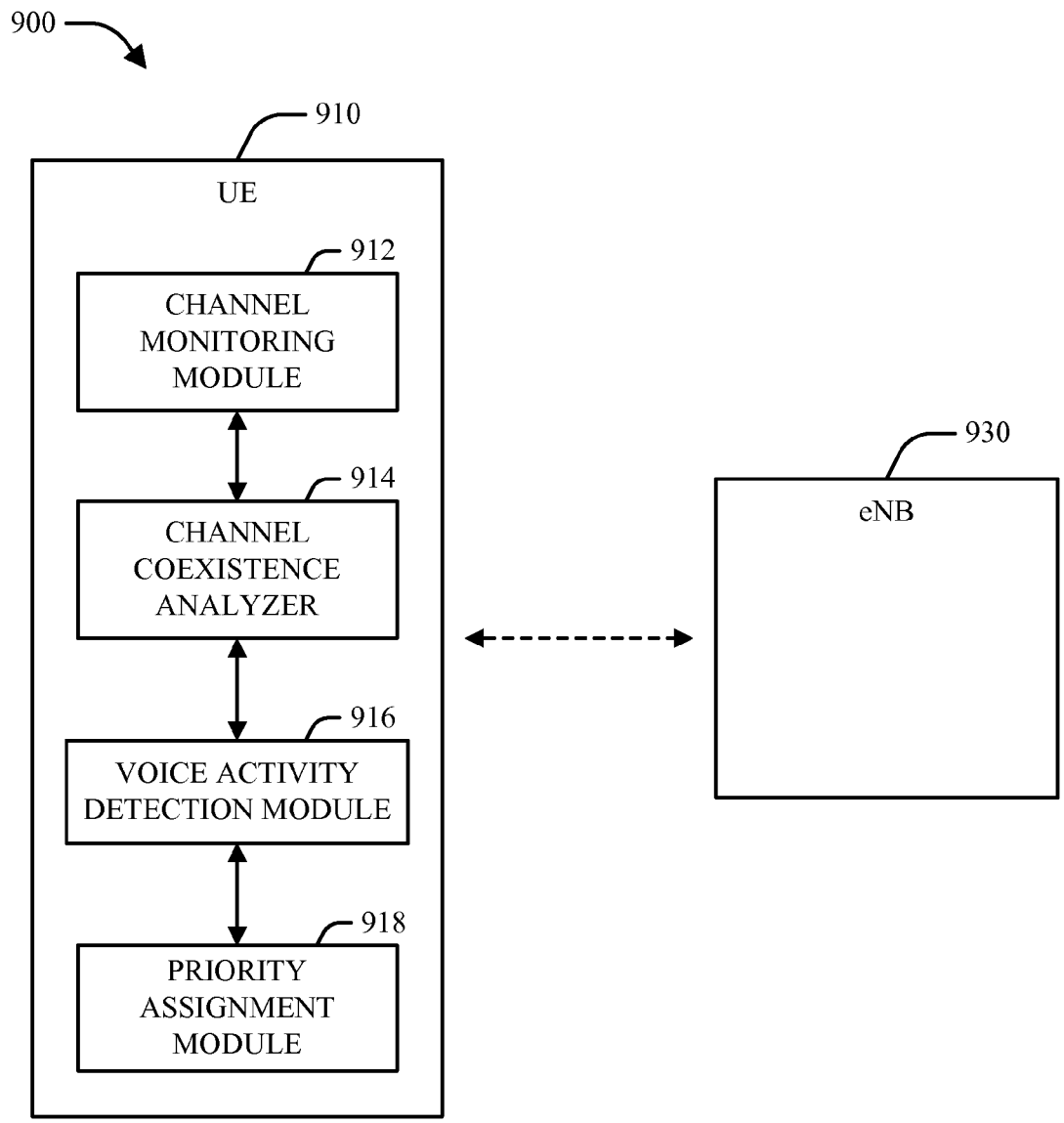
FIG. 9 is a block diagram of a system for providing support within a wireless communication environment for multi-radio coexistence management according to one aspect.

Turning now to FIG. 9, a block diagram of a system 900 for providing support within a wireless communication environment for multi-radio coexistence management is illustrated. In an aspect, the system 900 can include one or more UEs 910 and/or eNBs 930, which can engage in uplink, downlink, and/or any other suitable communication with each other and/or any other entities in the system 900. In one example, the UE 910 and/or eNB 930 can be operable to communicate using a variety of resources, including frequency channels and sub-bands, some of which can potentially be colliding with other radio resources (e.g., a Bluetooth radio). Thus, the UE 910 can utilize various techniques for managing coexistence between multiple radios of the UE 910, as generally described herein.

To mitigate at least the above shortcomings, the UE 910 can utilize respective features described herein and illustrated by the system 900 to facilitate support for multi-radio coexistence within the UE 910, including facilitating prioritization of network traffic according to detected voice activity. The UE 910 may include a channel monitoring module 912, a channel coexistence analyzer 914, a voice activity detection (VAD) module 916 and a priority assignment module 918. The various modules 912-918 may, in some examples, be implemented as part of a coexistence manager such as the CxM 640 of FIG. 6. In one embodiment, the CxM 640 utilizes the modules 912-918 to manage coexistence between resources, such as radios 620. Those skilled in the art will appreciate that the CxM may manage any number of radios.

In an embodiment, the radios 620 can facilitate and/or otherwise be associated with an audio connection, such as a voice call or other similar types of connections. In one example, multiple radios 620 can be involved with such an audio connection, such as one or more cellular communication technologies (e.g., LTE, GSM, CDMA2000, etc.), Bluetooth, WLAN, and/or any other suitable radio access technology. Accordingly, in order to manage coexistence between the radios 620 in the context of an audio connection, the CxM 640 may utilize the voice activity detection (VAD) module 916 to determine periods of non-activity (e.g., silence) and/or activity in an audio stream associated with the connection. Although module 916 is referred to as a "voice activity detection" module, it can detect more than voice and may also detect periods of silence (or no activity). In particular, in an embodiment, the VAD module 916 is able to determine when actual voice activity (or other audio content) is present in a transmission and when silence occurs. In one example, the content of the stream is classified into multiple levels based on the content of the stream. In particular, periods of voice activity may be assigned a higher value than periods of silence, and then classified accordingly into a particular level. In an example embodiment, a priority assignment module 918 assigns a priority to the actual content based on the determinations made by the voice activity module 916. Priorities are then assigned to the respective radios 620 based on the priority of the content being transmitted by the particular radio. For example, the priority assignment module 918 may assign a high priority to the radio transmitting voice activity and assign a lower priority to the radio transmitting silence.

While voice connections are bi-directional, it can be appreciated that the nature of human conversations tends to have one speaker at a time. For example, on average, each person in a voice conversation speaks approximately 40% of the time. Therefore, on average, a radio transmits voice content approximately 40% of the time and silence (or comfort noise) the remaining 60% of the time. Further, as noted above, when multiple radio technologies experience coexistence problems, the CxM 640 may be utilized to choose which radio(s) 620 are allowed to be active at any given time. In one example, the CxM 640 considers the priority of respective events in each radio 620 before deciding which radio(s) 620 to activate. Accordingly, if voice activity in the corresponding audio links is used in the decision making process of the CxM 640 (e.g., via VAD module 916), the performance of the system 900 may be improved without impacting audio quality.

In general, because humans tend to be highly sensitive to changes in audio, it can be appreciated that maintaining a high-quality audio connection can in some cases be more important than raw data throughput. Accordingly, in an aspect, because approximately 60% of a conversational audio stream is "silence" as noted above, the CxM 640 can operate to save power and base station bandwidth by reducing the number of packets sent during the silence periods of an audio stream.

By way of example, when an audio connection continues from a cellular network over Bluetooth, the two radios can cause mutual interference that would benefit from an arbitration scheme for mitigation. Traditional arbitration schemes operate by regarding the entire audio stream (e.g., corresponding to the Bluetooth audio link) as "high priority." In these traditional schemes the entire audio stream (voice content and silence) is transmitted. This means that during periods of silence, Bluetooth is using all of its bandwidth to transmit the silence. In contrast, in one embodiment, the VAD module 916 and priority assignment module 918 at the CxM 640 cooperate to assign reduced priority to silence portions of an audio stream (i.e., the non-activity portions). Thus, during periods of interference, the lower priority content (e.g., silence, or other non-essential content) is not transmitted thereby enabling more throughput to be obtained for the cellular radio without reduction in audio quality of the Bluetooth link. In one aspect the VAD module 916 is able to determine when actual voice content is present.

While the above example is directed to the specific case of multi-radio management for a cellular radio (e.g., LTE radio) and a Bluetooth radio, it should be appreciated that similar techniques could be applied for any suitable audio application running on any radio or combination of radios. Additionally, it should be appreciated that similar techniques may also be applied to any application in which content is transmitted between two or more resources. For example, the content may include but is not limited to video content, including streaming video and video conferencing, and audio content, including conversational audio, streaming audio, music and voice content. In another aspect the transmitted content is prioritized according to whether the content includes essential content or non-essential content. In one example, where audio content is transmitted, periods of silence may be categorized as non-essential content and prioritized accordingly.

Figure 10:
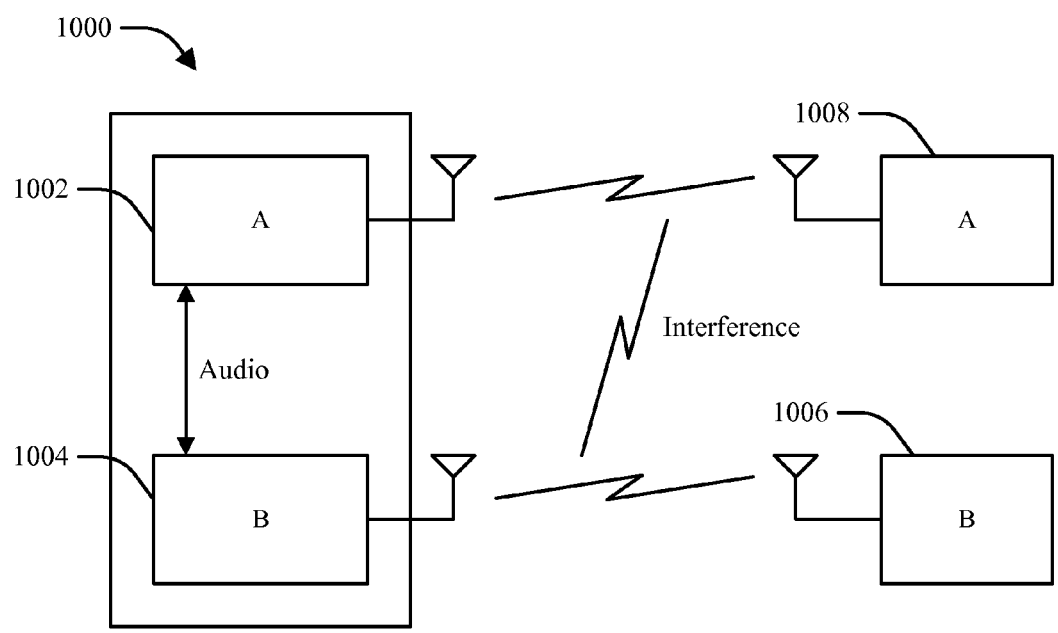
FIGS. 10-11 illustrate example resource connection scenarios according to various aspects.

In an aspect, a VAD assisted radio coexistence management system 900 may be applied to various use scenarios to improve overall system throughput. For example, as shown by the diagram in FIG. 10, various aspects described herein can be utilized to improve user experience associated with an audio connection over a technology A that later migrates to a technology B, where technologies A and B interfere with each other. In one example, technology A includes cellular technology and technology B includes any technology that transmits over the air, including, but not limited to WLAN and Bluetooth technologies. In an example, technology A includes the capability to detect voice activity and technology B does not have that capability. In particular, the cellular system 1002 includes a voice activity detection module (not shown) and a priority assignment module (not shown). The components of the cellular system 1002 review audio content transmitted between the cellular system 1002 and microphone/speakers of the UE 1000 and between the cellular system 1002 and the base station 1008 to determine when voice content is present. The voice content may then be transmitted to a Bluetooth system 1004 and a remote Bluetooth component 1006, for example a Bluetooth headset. Based on the analysis of the voice activity detection module (not shown), a coexistence manager (not shown) may arbitrate the transmissions from the cellular system 1002 and Bluetooth system 1004. The coexistence manager (not shown) may reside within the cellular system 1002 or elsewhere within the UE 1000.

Figure 11:
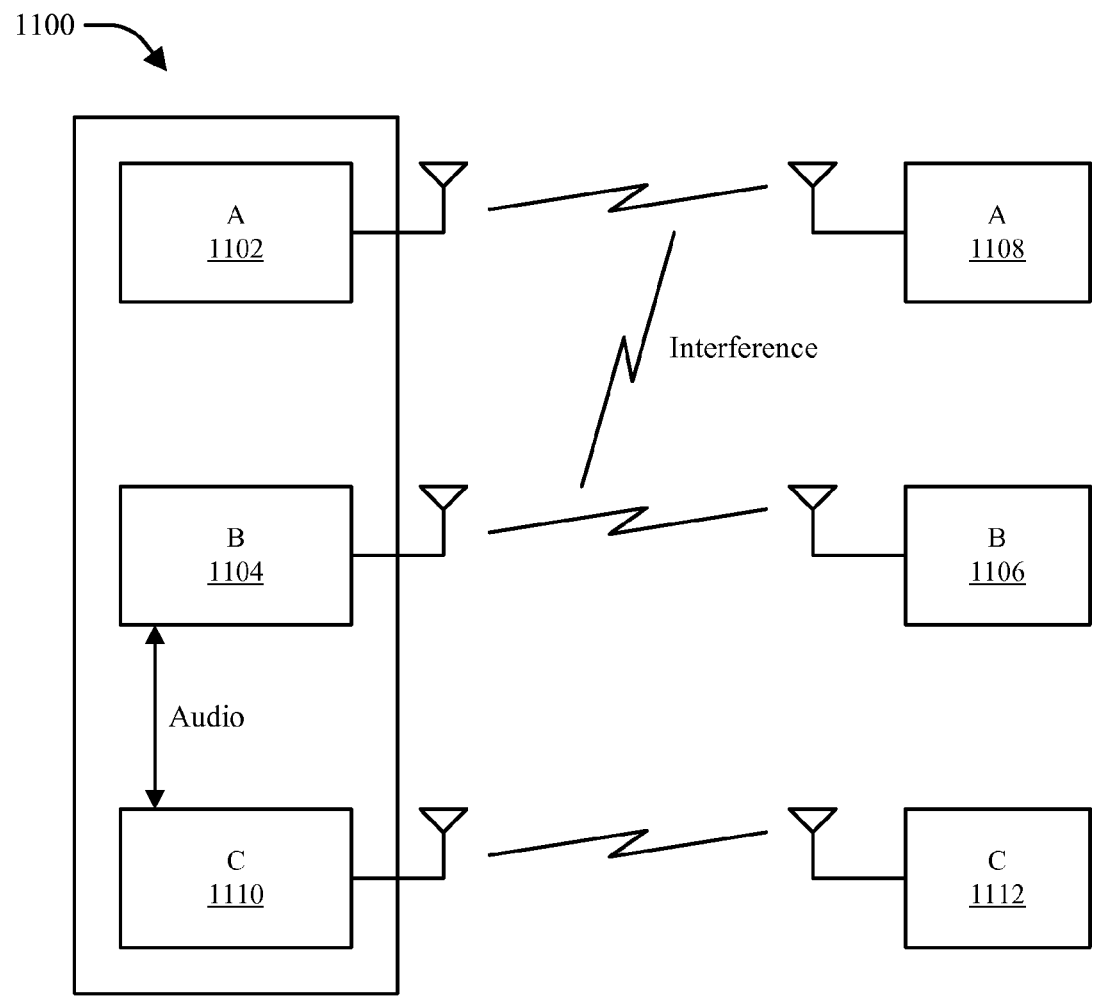

Likewise, with reference to the diagram in FIG. 11, various aspects described herein may be utilized to improve user experience associated with an audio connection over a technology C that later migrates to a technology B, where technologies A and B interfere with each other. In one example embodiment, technology A is LTE in data communications (i.e., no voice), technology B is Bluetooth, and technology C is 3G technology communicating voice content. The 3G system 1110 reviews audio content transmitted between the 3G system 1110 and microphone/speakers of the UE 1100 and between the 3G system 1110 and the 3G base station 1112 to determine when voice content is present. The voice content may then be transmitted to a Bluetooth system 1104 and a remote Bluetooth component 1106, for example a Bluetooth headset. Based on the analysis of the voice activity, a detection module (not shown), a coexistence manager (not shown) may arbitrate the transmissions from the LTE system 1102 and the Bluetooth system 1104. The coexistence manager (not shown) may reside within the 3G cellular system 1110 or elsewhere within the UE 1100.

Figure 12:
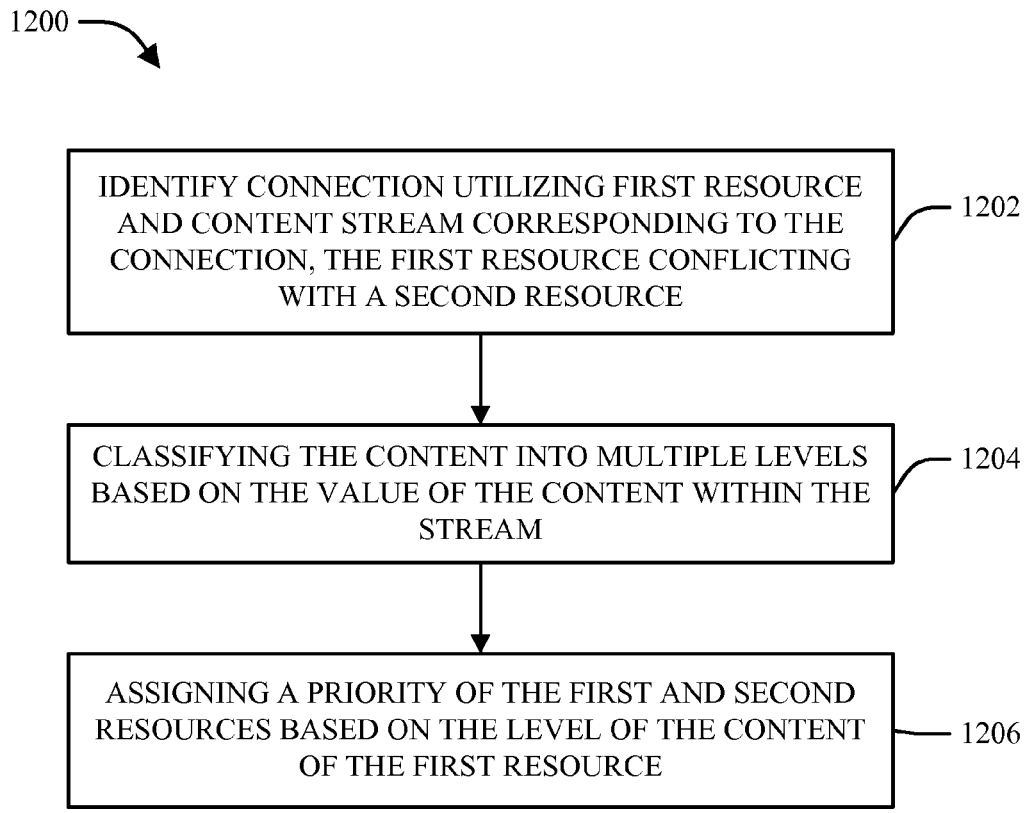
FIG. 12 is a block diagram illustrating an example process of facilitating voice activity detection according to one aspect.

FIG. 12 is a flowchart of a method 1200 for prioritizing resources in a wireless communication system. In block 1202, a connection utilizing a first resource and a content stream corresponding to the connection is identified. The first resource conflicts with a second resource. Next, in block 1204, the content of the stream is classified into multiple levels based upon the value of the content. A priority is assigned to the first and second resources based on the level of the content of the resources in block 1206.

In one configuration, the UE 250 for wireless communication includes an identifying means, a classification means and a priority assignment means. In one aspect, the aforementioned identifying means may be within the radios 620a-n of FIG. 6 configured to perform the functions recited by the aforementioned means. In another aspect, the aforementioned means may be a module or any apparatus configured to perform the functions recited by the aforementioned means. In one aspect, the aforementioned classifying means may be the CxM within the radios 620a-n, digital processor 630, and/or the controller processor 650 configured to perform the functions recited by the aforementioned means. In another aspect, the aforementioned means may be a module or any apparatus configured to perform the functions recited by the aforementioned means. In one aspect, the aforementioned priority assigning means may be the CxM 640 within the radios 620a-n, digital processor 630, and/or the controller processor 650 configured to perform the functions recited by the aforementioned means. In another aspect, the aforementioned means may be a module or any apparatus configured to perform the functions recited by the aforementioned means.

Various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communication, comprising:
    identifying interference between a first content stream received at a first connection of a user equipment (UE) and a second content stream transmitted at a second connection of the UE, the second content stream including content having periods of voice activity and periods of vocal silence;
    assigning, to the content of the second content stream being transmitted from the second connection, a first value to the periods of voice activity and a second value to the periods of vocal silence, the first value and the second value being used to assign a priority to the content of the second content stream; and
    assigning a priority to a radio transmitting the content of the second stream based on the first value and the second value, the radio having a first priority when transmitting periods of voice activity and the radio having a second priority when transmitting periods of vocal silence, the first priority being greater than the second priority.

2. The method of claim 1, in which the content comprises one or more of conversational audio, streaming audio, video, video conferencing, or a combination thereof.

3. The method of claim 1, further comprising arbitrating resources between the first connection and the second connection based at least in part on the assigned priority.

4. The method of claim 1, further comprising:
    receiving a third content stream at a third connection of the UE; and
    arbitrating resources between the first connection, the second connection, and the third connection based at least in part on the assigned priority, the third content stream being different from the first content stream.

5. The method of claim 1, in which identifying further comprises identifying a migration from the first connection to the second connection.

6. The method of claim 1, in which the second connection is a Bluetooth audio link.

7. A system for wireless communication, comprising:
    means for identifying interference between a first content stream received at a first connection of a user equipment (UE) and a second content stream transmitted at a second connection of the UE, the second content stream including content having periods of voice activity and periods of vocal silence;

means for assigning, to the content of the second content stream being transmitted from the second connection, a first value to the periods of voice activity and a second value to the periods of vocal silence, the first value and the second value being used to assign a priority to the content of the second content stream; and means for assigning a priority to a radio transmitting the content of the second stream based on the first value and the second value, the radio having a first priority when transmitting periods of voice activity and the radio having a second priority when transmitting periods of vocal silence, the first priority being greater than the second priority.

8. The system of claim 7, in which the content comprises one or more of conversational audio, streaming audio, video, video conferencing, or a combination thereof.

9. The system of claim 7, further comprising means for arbitrating resources between the first connection and the second connection based at least in part on the assigned priority.

10. The system of claim 7, further comprising:
means receiving a third content stream at a third connection of the UE; and
means for arbitrating resources between the first connection, the second connection, and the third connection based at least in part on the assigned priority, the third content stream being different from the first content stream arbitrating resources between the first connection, the second connection, and a third connection based at least in part on the assigned priority to the content of the second content stream, the third connection receiving a third content stream that is different from the first content stream.

11. A computer program product for wireless communications in a wireless network, comprising:
a non-transitory computer-readable medium having a program code recorded thereon, the program code comprising:
program code to identify interference between a first content stream received at a first connection of a user equipment (UE) and a second content stream transmitted at a second connection of the UE, the second content stream including content having periods of voice activity and periods of vocal silence;
program code to assign, to the content of the second content stream being transmitted from the second connection, a first value to the periods of voice activity and a second value to the periods of vocal silence, the first value and the second value being used to assign a priority to the content of the second content stream; and
program code to assign a priority to a radio transmitting the content of the second stream based on the first value and the second value, the radio having a first priority when transmitting periods of voice activity and the radio having a second priority when transmitting periods of vocal silence, the first priority being greater than the second priority.

12. The computer program product of claim 11, in which the content comprises one or more of conversational audio, streaming audio, video, video conferencing, or a combination thereof.

13. The computer program product of claim 11, further comprising program code to arbitrate resources between the first connection and the second connection based at least in part on the assigned priority.

14. The computer program product of claim 11, further comprising: program code to receive a third content stream at a third connection of the UE; and
program code to arbitrate resources between the first connection, the second connection, and the third connection based at least in part on the assigned priority, the third content stream being different from the first content stream.

15. An apparatus for wireless communication, comprising:
a memory; and
at least one processor coupled to the memory, the at least one processor being configured:
to identify interference between a first content stream received at a first connection of a user equipment (UE) and a second content stream transmitted at a second connection of the UE, the second content stream including content having periods of voice activity and periods of vocal silence;
to assign, to the content of the second content stream being transmitted from the second connection, a first value to the periods of voice activity and a second value to the periods of vocal silence, the first value and the second value being used to assign a priority to the content of the second content stream; and
to assign a priority to a radio transmitting the content of the second stream based on the first value and the second value, the radio having a first priority when transmitting periods of voice activity and the radio having a second priority when transmitting periods of vocal silence, the first priority being greater than the second priority.

16. The apparatus of claim 15, in which the content comprises one or more of conversational audio, streaming audio, video, video conferencing, or a combination thereof.

17. The apparatus of claim 15, in which the processor is further configured to arbitrate resources between the first connection and the second connection based at least in part on the assigned priority.

18. The apparatus of claim 15, in which the processor is further configured:
to receive a third content stream at a third connection of the UE; and
to arbitrate resources between the first connection, the second connection, and the third connection based at least in part on the assigned priority, the third content stream being different from the first content stream.

19. The method of claim 3, in which the arbitrating of resources comprises only transmitting, from the second connection, the content with the first priority.

20. The method of claim 1, in which the first connection is different from the second connection.

21. The method of claim 1, further comprising classifying the content of the first content stream based on the first value and the second value.

* * * * *